United States Patent [19]

Hoff

[11] 4,316,355
[45] * Feb. 23, 1982

[54] COMBINED FLYWHEEL AND CLUTCH MECHANISM FOR LAWN MOWER BLADE

[75] Inventor: Stephen J. Hoff, Richmond, Ind.

[73] Assignee: Hoffco, Inc., Richmond, Ind.

[ * ] Notice: The portion of the term of this patent subsequent to Jul. 14, 1998, has been disclaimed.

[21] Appl. No.: 114,956

[22] Filed: Jan. 24, 1980

Related U.S. Application Data

[63] Continuation-in-part of Ser. No. 65,951, Aug. 13, 1979, Pat. No. 4,277,936.

[51] Int. Cl.³ .............................................. A01D 69/08
[52] U.S. Cl. ...................................... 56/11.3; 56/11.7
[58] Field of Search ...................... 56/11.3, 10.8, 11.7, 56/11.8, 11.1; 192/12 R, 19

[56] References Cited

U.S. PATENT DOCUMENTS

| | | | |
|---|---|---|---|
| 3,026,665 | 3/1962 | Hoff | 56/11.3 |
| 3,253,391 | 5/1966 | Meldahl | 56/11.3 |
| 4,035,994 | 7/1977 | Hoff | 56/11.3 |
| 4,044,533 | 8/1977 | Wick | 56/11.3 |
| 4,148,173 | 4/1979 | Hoff | 56/11.3 |
| 4,152,881 | 5/1979 | Hoff | 56/11.3 |
| 4,205,737 | 6/1980 | Harkness et al. | 56/11.3 |

FOREIGN PATENT DOCUMENTS 1180198 10/1964 Fed. Rep. of Germany .... 192/12 R

Primary Examiner—Paul J. Hirsch
Attorney, Agent, or Firm—Jenkins, Coffey, Hyland, Badger & Conard

[57] ABSTRACT

A lawn mower engine having a lightweight top rotor of low polar inertia drives a rotary blade through a clutch-flywheel rotor having sufficient inertia to provide the major flywheel effect for the engine. Clutch faces at the rotor periphery engage a surrounding blade-carrier drum and have a maximum torque arm for positively driving the blade. The faces are preferably on centrifugal shoes which slip at load-reduced speed so as to maintain engine operation, and release at idling speed to allow engine starting with the blade stopped. A brake band or ring about the drum is spring-pressed ON to stop the blade when a deadman control is released. The preferred clutch-flywheel rotor is made of two heavy circular plates (e.g., $\frac{1}{4}''\times 6''$) riveted together against spacer slugs and a shouldered hub. Wide clutch shoes are mounted on such rotor by end tangs and springs between the plates. The top rotor plate substantially closes the top of the drum. Access and hub openings in the two plates provide rotor spacer slugs. The drum is slightly smaller than the mower deck opening to permit preassembly to the engine, and permit mounting the brake band on the engine-mounting bolts. The throttle lever in the path of the deadman lever is driven to idle position when the deadman lever is released. The rotor carries a clicker which makes an audible noise if the engine is stopped while the brake is OFF and the blade runs free under its own momentum.

24 Claims, 14 Drawing Figures

U.S. Patent  Feb. 23, 1982  Sheet 1 of 4  4,316,355
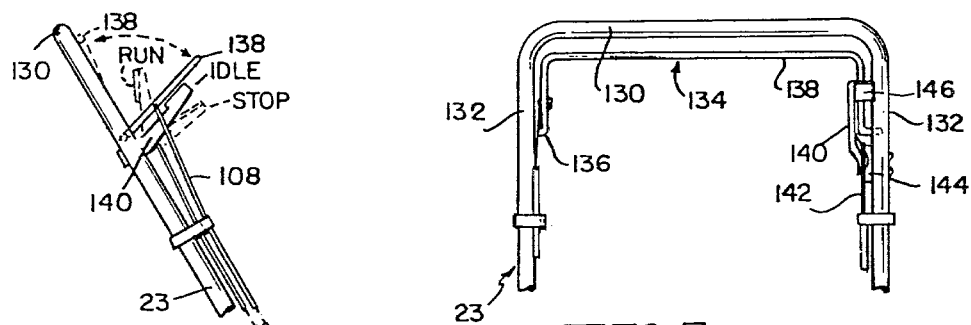
FIG. 7
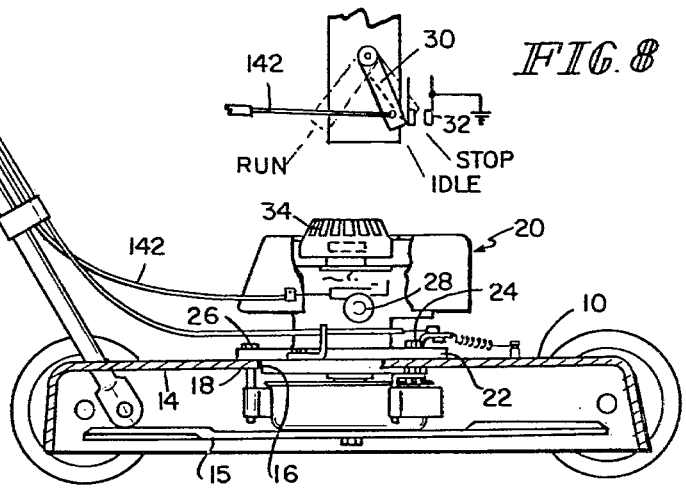
FIG. 8
FIG. 1
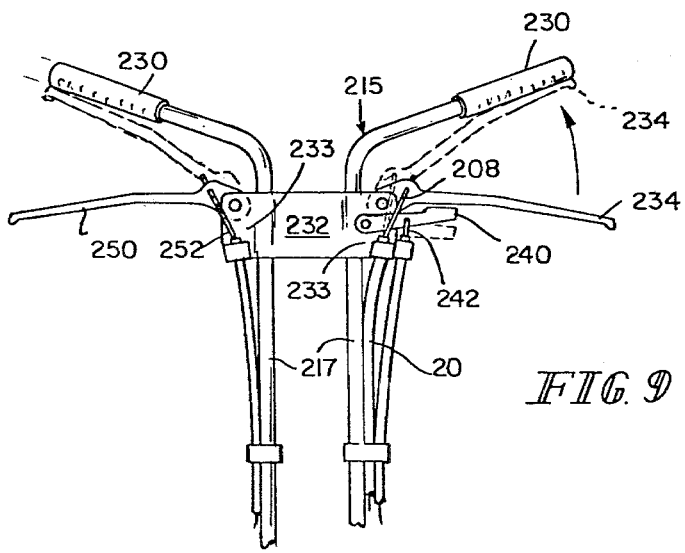
FIG. 9

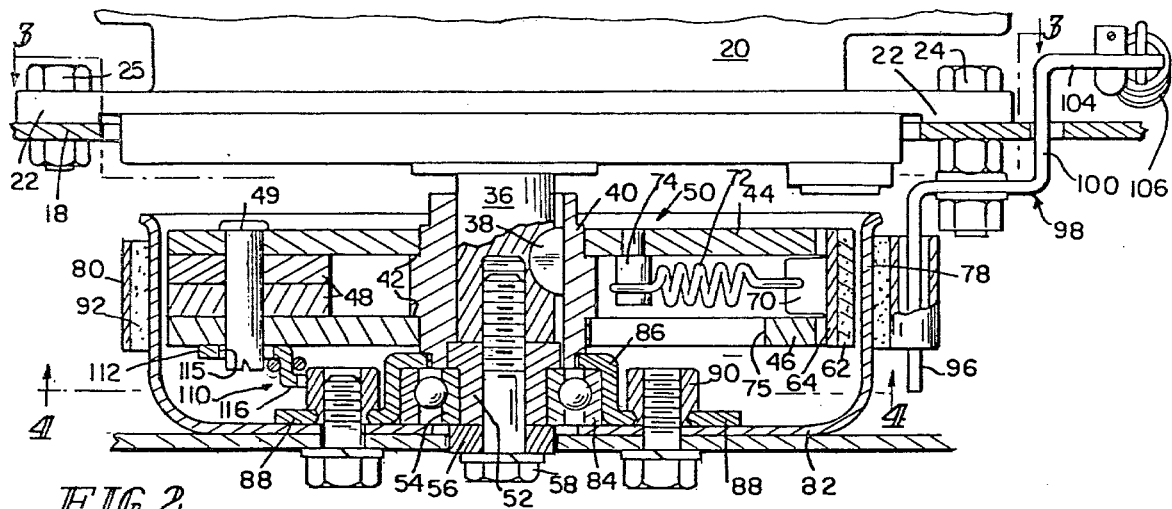

COMBINED FLYWHEEL AND CLUTCH MECHANISM FOR LAWN MOWER BLADE

This is a continuation-in-part of co-pending application Ser. No. 065,951, filed Aug. 13, 1979, for Combined Flywheel and Clutch Driver and Control and Warning Device, now U.S. Pat. No. 4,277,936, granted July 14, 1981.

For a number of years there has been a growing appreciation of the danger and other disadvantages of the common practice of fixing a rotary mower blade directly to the depending drive shaft of a vertical-axis engine. My prior U.S. Pat. No. 3,026,665 of Mar. 27, 1962 points out that such direct drive causes engine shafts to be bent when the blade strikes an obstruction, that overloading the direct-driven blade stalls the engine, with resulting inconvenience, and that the direct drive endangers the operator and others because the blade always rotates with the engine, even during starting and idling. The seriousness of this latter danger has lead the government to promulgate safety requirements for a "deadman" lever on the mower handle which will stop the blade except when the operator is in operating position and holding the lever. (Fed. Reg. Vol 44, No. 33, pp. 9990–10037, Feb. 15, 1979.) A deadman control requires high reliability, should cause minimum increase in the cost of the mower, and should have an effective and inexpensive control arrangement. My said prior patent, and my U.S. Pat. No. 4,035,994 of July 19, 1977, sought to improve safety and operation by declutching the blade from the engine drive shaft and braking the blade to a stop when the deadman lever was released. With the type of lawn mower engine which is made in large quantities and used almost universally in small lawn mowers, such declutching creates a problem in that the engine itself has only a relatively lightweight magneto and fan roter of low polar moment of inertia and relies on the blade itself for its major flywheel effect so that effective flywheel action is lost when the blade is declutched. A heavy cast-iron top rotor can maintain flywheel effect, but causes stress and breakage of engine shafts and would require a large increase of cast-iron foundry capacity. U.S. Pat. No. 4,035,994 and its divisional U.S. Pat. No. 4,148,173 sought to overcome this problem by mounting a separate flywheel on the driving hub of the blade clutch on the engine shaft, above the driven drum of the blade carrier. With the engine and clutch brake controls contemplated in those prior patents, if the engine lost power while the deadman lever held the brake OFF, the blade could run free or windmill silently and present a hazard. To overcome this, my U.S. Pat. No. 4,152,881 discloses an audible warning device in which a clicker arm is mounted on the clutch driver and sounds a warning in the event the motor stops and the blade overruns, while a centrifugal weight retracts the clicker arm when the clutch operates normally.

The present invention carries forward the concepts of those prior patents and provides improved blade drive and control mechanism. In accordance with the invention, a combined flywheel rotor and clutch driver is fixedly mounted on the engine shaft and has one or more clutch faces at its outer periphery for engagement with a surrounding driven-clutch ring on a blade carrier rotatable on the axis of the shaft. The rotor has large mass and polar inertia, desirably exceeding that of the engine top rotor and sufficient to provide a flywheel effect greater than, and preferably at least twice that of, the engine top rotor so as to provide the major part of the flywheel mass and effect for the engine. The clutch face or faces at the periphery of the rotor act with a maximum torque arm so as to be highly effective. The clutch face or faces are desirably on centrifugal clutch shoes mounted on the rotor, and their peripheral position permits use of small shoes spaced about the periphery to leave intervening room for large peripheral mass to increase the polar movement of inertia of the rotor.

Preferably, a blade carrier is mounted for rotation on the axis of the engine shaft and carries a cylindrical drum surrounding the clutch-flywheel rotor, mounted on the engine shaft.

The centrifugal clutch-flywheel rotor is preferably made from two large and heavy circular plates, e.g., $\frac{1}{4}'' \times 6''$, riveted together against a central shouldered hub and against peripherally spaced pairs of slugs stamped from the same heavy steel plate. The rotor has a plurality of centrifugal clutch shoes at its periphery, preferably with wide friction faces equal to the rotor width and mounted on the rotor by means of end tangs extending between the plates. Different shoe arrangements may be used to provide different clutching actions, ranging from a soft engagement or a highly aggressive self-energizing action. Also, additional shoe-actuating mass may be obtained by adding cylindrical weights of selected mass behind the clutch shoes, as in slots formed in the end plates of the flywheel-clutch rotor.

With the preferred centrifugal clutch rotor, the blade is carried on a carrier which is rotatable on the axis of the rotor and includes a drum surrounding such rotor as the driven element of the clutch. The large external surface of the drum is surrounded by a brake band. The drum is desirably not larger than the opening defined by the engine-mounting rim on the deck of the lawn mower, so that the rotor and drum can be assembled on the engine shaft before the engine is mounted on the deck, and will pass through that opening as the engine is so mounted. The large drum permits the brake band to be mounted on bolts in a standard engine-mounting pattern which also serve to mount the engine, and permits the brake band to be operated by a simple lever which extends up through the deck of the mower.

The massive, large diameter flywheel-clutch rotor not only provides the necessary flywheel effect, but also places the clutch shoes at a large radius so that small shoes will have a highly effective clutching action, yet can be spaced to allow more flywheel mass at the periphery of the rotor. The large brake drum provides highly effective braking. Both the clutch and brake are of high capacity and durability so as to have long life and high operating reliability even when operated in an adverse exposed condition below the deck of a lawn mower. The top plate of the rotor is closed so that the rotor and drum form a substantially closed assembly, which does not require the protective and brake-mounting bowl and a number of other parts which were required in the mechanism of U.S. Pat. No. 4,035,994. It also eliminates the necessity for a separate flywheel as contemplated in U.S. Pat. No. 4,148,173.

In accordance with the invention, different flywheel inertia amounts can be provided to meet the requirements of different engines by increasing the mass of the rotor structure or by modifications of a standard rotor. In one modification, additional mass is added to the periphery by adding slugs of metal to the bottom of the rotor to rotate in clearance space below the rotor and between the cylindrical portion of the drum and the central mounting structure. In a second modification, a supplemental flywheel disk is mounted on the bottom end of the engine shaft, below the blade mounting. For example, a standard flywheel-clutch rotor having a polar moment of inertia of 22.7 lb. in.$^2$, when combined with a standard engine top rotor of 10.3 lb. in.$^2$, gave a total of 33 lb. in.$^2$ which was more than sufficient to meet the 27 lb. in.$^2$ requirement of one engine. Additional moment of 3.7 lb. in.$^2$, to make a total of 36.7 lb. in.$^2$, was provided by adding slugs of metal to the bottom periphery of the rotor and this was more than sufficient to meet the 35 lb. in.$^2$ requirement of another engine. Still more moment was obtained by adding to the bottom end of the engine shaft a supplemental flywheel disk having a moment of 11.2 lb. in.$^2$ so as to meet the 43 lb. in.$^2$ requirement of a third engine.

A simplified blade rotation warning device is desirably mounted directly on the flywheel-clutch rotor and biased to a position in which it lies in the path of a striker element, such as a blade-mounting nut, within the drum so as to produce an audible warning signal as contemplated in U.S. Pat. No. 4,152,881. Two modifications are shown.

Further in accordance with the present invention, the brake is biased to ON position and connected to a manual deadman lever so that the brake is released when the deadman lever is held in actuated position; while the engine has a separate manual throttle control with "stop", "idle", and "run" positions which is mounted in the path of brake-applying movement of the deadman lever so as to be moved by that lever to its idle position when the deadman control lever is released from its actuated position. This control arrangement provides desirable capability for the deadman lever to be moved to actuated position independently of the throttle control and while the throttle control remains in idle position, which is especially desirable in self-propelled mowers. It permits throttle adjustment over a range of run positions, and it insures that the throttle will be moved from any run position to idle position when the deadman lever is released. However, this also permits the throttle control to be moved from a fast run position to idle or stop while the deadman lever is held actuated, which has the effect of releasing the centrifugal clutch from drive connection with the blade while the brake is held disengaged by the deadman lever so that the blade can run free under its own momentum while the sound of the engine fails to give any warning of such dangerous rotation. Under such conditions, the clicker gives an audible signal of the overrunning operation of the blade.

The accompanying drawings illustrate the invention and show preferred embodiments exemplifying the best mode of carrying out the invention as presently perceived.

In such drawings:

FIG. 1 is a side elevation of a manually propelled lawn mower embodying the invention;

FIG. 2 is a vertical section showing the blade and brake mechanism of the mower of FIG. 1;

FIG. 3 is a plan view of the blade drive and brake mechanism, having flail-type clutch shoes, taken on the line 3—3 of FIG. 2;

FIG. 5 is a partial section taken on the line 5—5 of FIG. 3;

FIG. 7 is an elevational view of the upper portion of the lawn mower handle shown in FIG. 1, showing the deadman lever and a throttle control;

FIG. 8 is a diagrammatic plan view of the engine throttle arm and associated grounding switch;

FIG. 9 is a view of an alternative handle and control mechanism which includes a propulsion control for a self-propelled mower;

Figure 14:
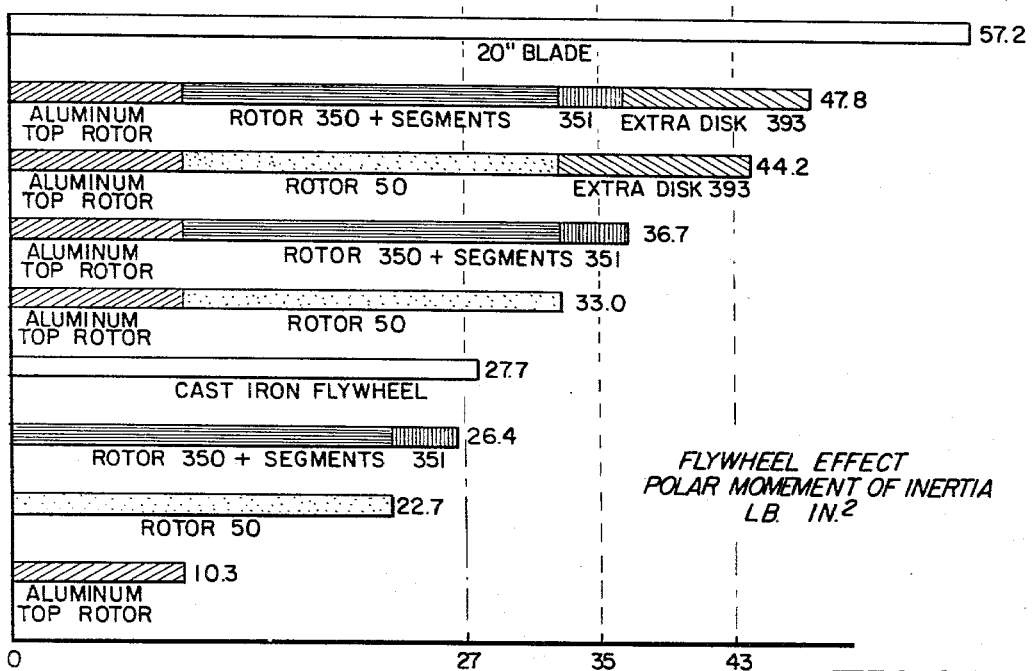
FIG. 14 is a bar graph showing polar moments of inertia of various flywheel elements.

The lawn mower shown in the drawing comprises a housing 10 mounted on suitable wheels and having a top deck 14 and a handle 23. The deck has a central opening 16 defined by a surrounding rim 18 on which the engine 20 is mounted by means of a mounting flange 22, for driving the blade 15. Conventionally, the engine is held in place by three bolts 24, 25, 26 in a generally accepted standard bolt pattern. The engine 20 has a carburetor 28 controlled by a governor or throttle arm 30 movable between idle and a range of run positions, and movable beyond idle to engage a grounding switch 32 for grounding the ignition of the engine and thus stopping it.

The engine has a vertical shaft, the upper end of which carries a magneto and fan rotor 34 of relatively light weight and low polar moment of inertia, insufficient to provide the desired flywheel effect for the engine. The lower end 36 of the shaft projects downward from the engine housing into the space below the mounting deck 14, and has a blade supporting and driving mechanism mounted thereon, as shown in FIGS. 2 and 3. This comprises a hub 40 keyed to the shaft end 36 by a key 38 and formed with opposite facing shoulders 42. A generally circular top plate 44 and similar bottom plate 46 are mounted on the hub against such shoulders 42, and at their outer peripheries are held in spaced relation by three pairs of spacer slugs 48. The two plates 44 and 46 are riveted together against such spacer slugs by rivets 49 so that with the hub 40 they form a generally circular unitary rotor 50 which is keyed to the shaft 36 and rotates therewith. An extension 52 is press-fitted in the bottom end of the hub 40 and has a smaller diameter portion which receives the inner race 54 of a ball bearing set, and such race is secured to the hub by a washer 56 and a bolt 58 threaded into the lower end 36 of the engine shaft.

The rotor 50 serves both to provide the primary flywheel effect for the engine 20 and also a centrifugal clutch drive member. To provide such flywheel effect, the rotor 50 is formed of heavy plates 44, 46, conveniently stamped from heavy hot-rolled steel plate, for example, quarter-inch steel plate, and of relatively large diameter, for example, six-inch diameter. The spacers slugs 48 form weights which add to the peripheral mass of the rotor 50 to increase its rotational or polar moment of inertia and its flywheel effect. The diameter of the rotor and the surrounding clutch drum referred to below is related to the size of the opening 16 in the mower deck 14 and desirably is the maximum size that will pass through that opening, so as to permit the rotor and drum to be assembled to the shaft end 36 before the engine is mounted on the mower deck and to pass through the opening 16 as the engine is thus mounted. This permits the plates and rotor to be of large mass and diameter and of sufficiently large polar moment of inertia to provide the major flywheel effect for the engine.

Figure 6:
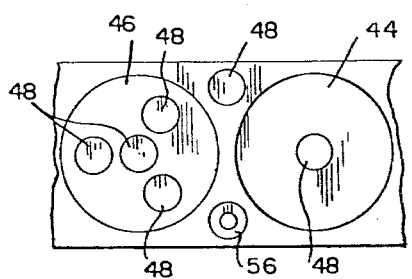
FIG. 6 is a diagrammatic view of a die-cutting pattern which provides the top and bottom plates of the clutch rotor and also provides the spacer slugs against which they are riveted.

For purposes of the function of the rotor 50 as a centrifugal clutch driver, the generally circular top and bottom plates are formed at three spaced points about their peripheries with shallow recesses 60 between the positions of the spacer slugs 48. Clutch shoes 62 are mounted in such recesses and, as shown in FIGS. 2 and 5, have clutch face portions 64 of substantially the same full width as the rotor 50, and are mounted by means of narrower tangs which enter between the plates 44 and 46. In the modification of FIGS. 2-5, the tang 66 at the leading end of each shoe 62 is bent to form a pivot loop at its leading end which is mounted on a pivot pin 68 passing through the two plates and held in place with a retainer clip 69. The tang 70 at the trailing end of each clutch shoe 62 is engaged by a biasing spring 72 which extends inward to an anchor post 74 having a drive fit in an opening in the top plate 44. For purposes of providing access to the springs 72 and to permit them to be engaged on the posts 74 and tangs 70, the bottom plate 46 is desirably provided with three circular access openings 75, shown in FIG. 4. Such openings and the central hub-receiving openings of the two plates are desirably all of the same size, and all are formed by punching circular slugs out of the steel plate material, which slugs are used as spacer slugs 48. As will be seen in the stamping pattern of FIG. 6, which may be used to form the plates and the slugs, the bottom plate 46 has four such openings and the top plate has a single central opening so that such openings provide five of the six required spacer slugs 48. The sixth may be punched from scrap material in the margin between the two plates 44 and 46, and the hub-retaining washer 56 may be stamped from the opposite marginal portion of the stock material.

The combined flywheel and clutch drive rotor 50 is surrounded by a cylindrical drum 78 adapted to be engaged on its inner surface by the centrifugal clutch shoes 62 and on its outer surface by a brake band 80. The cylindrical drum 78 is connected at the bottom to a radial flange 82 extending inward into underlapping relation with the outer race 84 of the ball bearing set previously referred to. Such outer race 84 is retained between the inner edge of the drum flange 82 and the inturned flange at the top of a mounting ring 86 which has a wide base flange 88 flying against the drum flange 82. Such flange carries at diametrically opposite points a pair of rivet nuts 90 which have upstanding nut portions and neck portions which extend through the flanges 88 and are clinched or riveted thereto. The flanges 82 and 88 are desirably riveted together at at least two points angularly spaced from the nuts 90. The drum-mounting ring 86 and the rivet units 90 are thus nested within the cylindrical wall 78 and spaced inward therefrom so as to leave an annular space within such wall 78 and outward of the path of relative movement of the nuts 90 as the drum and rotor rotate relative to each other. The rotor 50 is nested in the drum 78 and its top plate is substantially imperforate and substantially closes the open upper end of that drum, so that the drum and rotor form a substantially closed assembly suitable for operation in exposed position above the blade.

The brake band 80 carries a lining 92 over most of its length, and is formed at its ends with mounting loops 94. The loop at one end is anchored to the motor mounting bolt 26, which is made long enough to extend through the plane of the brake band for this purpose. The opposite end loop 94 is engaged on the downturned finger 96 of a brake lever 98 which is pivotally mounted between a pair of nuts on the bottom end of the motor mounting bolt 24. Outward from such pivotal mounting, the brake arm 98 has an upward extending portion 100 which extends through an arcuate opening 102 in the mower deck 14, and above that deck has an outward extending portion 104 which is connected to a brake-actuating spring 106 which normally biases the lever 98 in a direction to apply the brake to the drum 78. An actuating cable 108 is connected to the end portion 104 of the brake lever to move it to release position, as will be described below.

Figure 4:
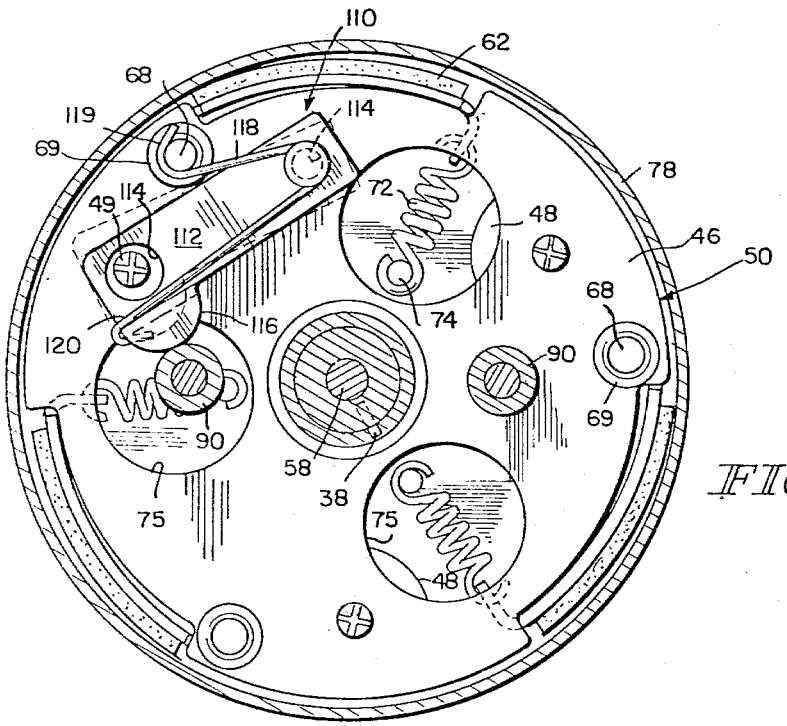
FIG. 4 is a section taken on the line 4—4 of FIG. 2 showing the flywheel and clutch rotor in bottom elevation (and oriented differently than in FIG. 2) and showing an audible signal device mounted on that rotor.

As shown in FIGS. 2 and 4, the bottom face of the rotor 50, within the annular area outside the path of relative movement of the nuts 90, carries a clicker lever 110 adapted to make an audible signal when the blade overruns the clutch driver. Such lever has a flat plate portion 112 which lies slidably against the bottom surface of the bottom plate 46 and is pivoted to that plate by a shouldered rivet 114. From that pivot, the plate 112 extends to and beyond the position of one of the rivets 49 by which the spacer slugs are riveted between the rotor plates, and the clicker lever is there provided with a large opening 115 which surrounds the lower end of the rivet 49 so that such rivet serves as a stop for movement of the lever between a normal position shown in full lines in FIG. 4 and a retracted position shown in dotted lines in FIG. 4. At its free end, the clicker lever 112 carries a downward offset formed with a rounded inner nose 116 which normally lies in an interfering relationship with the drum nuts 90.

The clicker lever 110 is biased by a biasing spring 118 to its normal position, in which its nose 116 is adapted to strike the drum nuts 90. The spring has a central bight engaged about the shouldered rivet 114, has a fixed end 119 looped about the end of an adjacent shoe pivot pin 68, and has a movable end 120 engaged against the side face of the offset at the end of the clicker arm and hooked beneath its nose 116. The strength of the biasing spring 118 is such that if the rotor 50 is rotating at a predetermined rate, which is desirably below the idling speed of the engine, the clicker arm 110 will be swung by centrifugal force outward from its normal position shown in full lines in FIG. 4 to its retracted position, where its nose 116 will be carried out of interfering relation with the drum nuts 90. If the rotor 50 is stopped, the clicker arm 110 will remain in its normal position and if the blade and drum assembly overruns the rotor 50, the drum nuts 90 will strike the offset end 160 of the clicker arm and will produce a loud clicking noise which will serve as a warning signal that the blade is rotating and dangerous.

In my prior patents, the blade brake and the engine throttle were both connected to a single deadman control lever so that actuation of that lever from release position to actuated position would both release the brake and move the throttle from idle to a predetermined high speed run position, while release of that lever would apply the brake and move the throttle to idle position. In accordance with the present invention, the brake and throttle are connected to separate manual controls which have an interacting relationship that permits the deadman lever to be moved to actuated position, to release the brake, without actuating the throttle, and which then allows the throttle to be manually adjusted to a run position over a considerable range and hence allows the engine to be operated at different speeds. On the other hand, the interrelationship is such that when the deadman lever is released, it actuates the throttle from any run position to its idle position so as to reduce the engine and clutch driver speeds and allow the centrifugal clutch to disengage as the brake is applied.

As shown in FIGS. 1, 7, and 8, the mower handle 23 is formed at its upper end in a generally U-shaped configuration with a transverse hand grip bar 130 and side portions 132. A deadman lever 134, also in generally U-shaped configuration, has out-turned ends 136 received in punched openings in the side legs 132 of the handle and has a cross bar 138 which in actuated position shown in dotted lines in FIG. 1 lies close to the cross bar 130 of the handle and when released swings forward to a release position shown in full lines in FIG. 1. One side leg of the deadman lever is connected to the brake cable 108, so that as the deadman lever is moved from its release position to its actuated position against the handle cross bar 130, the brake lever 98 is swung against the bias of the tension spring 106 and in a direction to release the brake band from the blade drum.

The throttle lever 30 of the engine is connected to a separate throttle control lever 140 by a Bowden wire 142 capable of both pull and push transmission of movement. The throttle control lever 140 is pivoted on a side leg 132 of the mower handle on a pivot axis close to the pivot axis of the deadman lever 134, as by means of a bracket 144 mounted on the side leg. Also, the throttle lever 140 has a handle 146 or other portion which lies in the path of the adjacent side leg of the deadman lever 134 so that the deadman lever will drive the throttle lever to its idle position as the deadman lever moves from actuated to release position. The throttle control lever is also manually movable beyond the idle position to a stop position, in which it drives the throttle lever 30 on the carburetor against the grounding switch 32 so as to ground out the ignition of the engine and stop the engine.

Operation of the mechanism so far described is as follows: It is assumed that the engine is stopped, the deadman lever 134 is in released position, and the throttle control lever in stop position. The brake band 80 will then be engaged with the blade drum 78, the clutch shoes 62 will be retracted, and the clutch disengaged from the drum 78. The engine is desirably one which will start at idle setting, in which case the brake is left engaged and the throttle lever moved from stop to idle, and the engine then started. At idle speeds, say from 1,200 to 2,000 rpm, the clutch shoes will remain retracted and the clutch will remain disengaged while the brake remains engaged to hold the blade stopped. If the engine requires a run position for starting, the deadman lever 134 is moved to its actuated position and manually held against the handle cross bar 130, and the throttle control lever moved to a start position, and the engine is then started with the brake disengaged. The throttle may then be moved to idle position until mowing operation is desired.

For mowing operation, the deadman lever is moved to operating position against the handle, and the throttle moved to a selected point in the range of run positions between idle and full-speed positions. Movement of the deadman lever releases the brake, and acceleration of the engine causes the centrifugal clutch shoes 62 to engage the blade drum 78 so as to drive the blade 15. For example, engagement may occur at 2,100 to 2,150 rpm. The throttle lever may be manually adjusted to vary the cutting speed of the blade to suit the load conditions. If the mower encounters heavy gases and/or weeds and is overloaded, the excess load will reduce the speed of the blade, and this in turn will reduce the speed of the engine and the clutch driver 50 so that the clutch will partially slip and allow the engine to continue operation at high torque. Such operation in many cases will overcome the excess load and the engine will regain speed and the clutch will become fully engaged and drive the blade at full speed. If the load is such as to stop the blade, the clutch will be sufficiently slowed and released to permit the engine to continue to operate and the load will not "kill" the engine. The operator can then take suitable action to relieve the load, such as to back off from the heavy grass or to tilt the mower to lift the blade out of the grass, so as to allow the blade to resume rotation. This will allow the clutch driver and engine to resume speed and re-establish full driving force to the blade. This ability to maintain the operation of the engine is enhanced by the large diameter of the centrifugal clutch and the long torque arm with which the shoes operate, and also by the immediate presence of the flywheel effect of the combined flywheel-clutch rotor.

To discontinue mower operation, the deadman lever is released from its manually held actuated or operating position. The tension of the brake-actuating spring 106 will then pull the brake lever 98 to its brake-engaging position. As the deadman lever 134 moves to its released position as shown in full lines in FIG. 1, its side leg will strike the throttle control lever 140 and move that lever to its idle position. This will reduce the speed of the engine and consequently that of the clutch driver, the clutch will disengage, and the engine will then continue to operate at idle speed. Such operation will be smooth and regular, despite the disconnection of the mass of the blade from its connection with the engine shaft, by reason of the flywheel effect of the flywheel-clutch rotor 50 which continues to rotate. To stop the engine, the throttle control lever is manually pushed from idle to stop position, and this moves the throttle lever against the grounding switch 32 to ground out the ignition.

In all of these operations described above, the flywheel and clutch rotor 50 will be either operating at the same speed as the blade and blade drum 78 or will be overrunning such drum and blade and rotating at a speed which will cause centrifugal force to move the clicker lever 112 to its retracted position out of the path of relative movement of the drum nuts 90 so that there will be no engagement between those nuts and the clicker offset nose 116 and no audible signal will be generated. On the other hand, if the deadman lever 134 is held in its actuated position while the throttle control lever is moved to its stop position, the deadman lever will hold the brake 90 disengaged while the engine will be stopped so as to cause the centrifugal clutch shoes to retract and the clutch to be disengaged. This will leave the blade and blade drum 78 free to rotate under their own momentum, and such momentum may be sufficient to cause the blade to continue to rotate for several seconds at speeds sufficient to be dangerous in the event an operator or bystander moves his hand or foot into the path of the rotating blade. Under these conditions, however, centrifugal force on the clicker arm 110 will not overcome the biasing spring 118, and that arm will move to its normal position shown in full lines in FIG. 4, where its offset nose 116 will lie in the path of relative movement of the drum nuts 90. Accordingly, such drum nuts will strike that nose and produce a loud clicking or clacking sound which will serve as a warning that parts of the mower are still rotating and that hands and feet should be kept out of the path of the blade.

As has been indicated, the heavy rotor 50 mounted directly on the lower end of the crankshaft 36 can provide the primary flywheel effect for the engine and permit the engine to be used with a relatively lightweight magneto and fan rotor 34 at the top of the engine. By way of example, a typical engine may have a top rotor weighing about one pound, eleven ounces, with a polar moment of inertia of 10.3 lb. in.$^2$, and may require flywheel means having a polar moment of inertia of 27 lb. in.$^2$. For such engine, a standard rotor 50 may be used which weighs about four and one-half pounds and has a polar moment of inertia of 22.7 lb. in.$^2$, so that the two rotors together provide a moment of 33 lb. in.$^2$, well above the required 27 lb. in.$^2$. Substantially the same engine is available on the market in limited quantities and at substantial extra cost with a heavy flywheel at the top weighing about five pounds, eleven ounces, and having a polar moment of inertia of 27.7 lb. in.$^2$, but the flywheel arrangement of the present invention has substantial advantages over the use of that heavy flywheel engine. When a heavy flywheel is used at the top of the engine and connected to a mower blade during use, and if the blade strikes a fixed object, the crankshaft is severely stressed in torque and may break. In contrast, with the mass of the flywheel closely adjacent the blade, such crankshaft torque stresses are avoided. Also, when the end of a blade strikes a fixed object, the blade tends to rotate about the point of impact, and this causes a lateral bending thrust on the crankshaft. The presence of the mass of the rotor 50 closely adjacent the blade at its center tends to absorb the lateral thrust under such circumstances and thus further tends to reduce damage from such impact. The present invention places the mass of the rotor 50 even closer to the blade than the mass of the flywheel in U.S. Pat. No. 4,035,994.

The large diameter of the rotor 50 not only contributes to its effectiveness as a flywheel, but also provides advantages in its function as a clutch driver. The clutch shoes lie at a long radius from the axis so that they transmit torque with a long lever arm. They can therefore be made smaller and spaced from each other to allow the slugs to be placed circumferentially between them and close to the periphery to increase their polar moment effect. The shoes are also highly responsive to rotational speed and provide high capacity for the clutch. The shoes of FIGS. 2-5 are pivoted to the rotor at their leading ends so that they are flail-type shoes which are not self-energizing and give a relatively soft clutch operation. The shoes are subjected to less loading than in a smaller diameter clutch and hence can be made of less expensive material. Thus, for example, the shoes in the smaller diameter clutch shown in U.S. Pat. No. 4,035,994 are desirably made as formed powdered metal parts, whereas the shoes of the present clutch may be made as stampings with frictional lining material bonded to them. The resulting clutch is adapted to withstand prolonged operation under slipping conditions, without such excessive overheating as to cause dangerous failure.

The combined flywheel and clutch mechanism is of relatively simple and inexpensive construction, and is especially advantageous for its application to a lawn mower blade drive as here shown. Beside being functionally advantageous, the rotor and drum form a substantially closed assembly which is suitable for exposed operation in the same chamber with the blade. In addition, the same mechanism is adapted for various other uses. On the one hand, it can adapt the relatively inexpensive type of engine shown and described to a variety of other uses, by providing an effective flywheel at the output end of the shaft while also providing a centrifugal clutch function. On the other hand, it provides an advantageous clutch structure of high capacity and high reliability which can have a variety of applications where the clutch function is of primary importance and the flywheel function of less importance. Examples of such applications include drives for snow blowers, for post hole augers, for garden equipment such as tillers, for pumps, etc.

The modified handle and control mechanism shown (somewhat diagrammatically) in FIG. 9 provides not only for a deadman control of the brake for a lawn mower blade and for the throttle of the driving engine, but also a separate control for engaging and disengaging the propulsion drive of a self-propelled mower having a flywheel and clutch combination as shown in the earlier figures. The mower handle 215 shown in FIG. 9 comprises a pair of tubular bars 217 having out-turned ends forming handle grips 230. The bars are clamped together adjacent their upper ends by a clamp 232 which has outer flange portions 233 which provide for pivotal mountings. At one side, preferably the left side as viewed from the operator (to the right in FIG. 9), a deadman lever 234 is pivoted for movement between a released position shown in full lines and an actuated position adjacent the adjacent handle bar 230 as shown in dotted lines. Such deadman lever is attached to a control cable 208 connected to the brake lever 98 in the same manner as the cable 108 shown in FIGS. 1-3. Immediately below the deadman lever 234, a throttle control lever 240 is pivoted to the same flange 233 and connected to a push-pull Bowden wire 242 connected to the engine throttle lever in the same manner as the wire 142 in FIG. 1. The throttle lever 140 has an idle position shown in full lines in FIG. 9 and is movable therefrom downward to a stop position shown in dotted lines, and upward through a range of run positions. The relationship between the deadman lever 234 and the throttle lever 240 is functionally similar to that in FIGS. 1, 7, and 8, in that the throttle lever 240 has a handle or other portion which lies in the path of the deadman lever 234 so that the throttle cannot be moved to run positon when the deadman lever is in released position and so that the throttle lever will be driven from a run position to its idle position when the deadman lever moves from actuated to release position.

At the opposite side of the structure, a propulsion control lever 250 is pivotally mounted to the flange 233 and is movable between a released, non-drive position shown in full lines to an actuated, drive position shown in dotted lines. The propulsion lever 250 is connected by a Bowden wire 252 or the like to the propulsion clutch mechanism of the self-propelled mower, which mechanism may take any of several known forms and need not be here described. For present purposes, it is sufficient to note that when the propulsion lever 245 is in its non-drive position as shown in dotted lines, the propulsion drive mechanism is disconnected and no self-propulsion drive takes place, whereas when the lever 250 is manually pulled up against the handle bar 230, the self-propulsion mechanism is engaged so that power is transmitted from the engine to the drive wheels of the lawn mower to propel it forward.

The combined flywheel, clutch, and brake mechanism, and the controls therefor are of special advantage in connection with a self-propelled mower. On the one hand, the propulsion control lever 250 may be left in its non-drive position, and the deadman and throttle control levers operated in the manner described above so that the mower is operated as a manually propelled mower in the same manner as explained in connection with the mower of FIGS. 1-8. On the other hand, the deadman lever can be left in released position, with the throttle control in idle position so that the engine is operating at idle speed, and the propulsion control handle 250 may be manually moved to its actuated position against the handle bar 230 so as to engage the propulsion drive and cause the mower to be propelled by the idling engine. Under these conditions, the mower blade will be positively held stopped by the brake band 80 while the engine and clutch rotor 50 will be rotating at idling speed at which the clutch shoes 62 will be retracted and the clutch disengaged. The mower can thus be propelled across a gravel driveway or other surface on which it is desirable or necessary that the blade remain stationary for safety reasons.

The control mechanism of FIGS. 1-3 and 7-8, and that of FIG. 9, are shown in relation to handle designs which are somewhat diagrammatically representative of handles in use by different mower manufacturers, and it will be understood that various other handle designs are in use and that the control mechanism may be modified by those skilled in the art to suit such other designs.

The blade drive and brake mechanism shown in FIGS. 10-13 is basically similar to that of FIGS. 1-5, but with certain modifications and additions. The lower end 336 of the engine shaft carries a hub 340 keyed to the shaft and having opposite facing shoulders 342. Circular top and bottom plates 344 and 346 are mounted on the hub and against three pairs of spacer slugs 348, and held by rivets 349 so as to form a unitary rotor 350. A reduced bottom end on the hub 340 carries the inner race 354 of a ball bearing set, which is secured by a spacer 356 and bolt 358. The outer ball bearing race 384 is clamped between the web 382 of a drum 378 and the offset inner flange of a mounting ring 386. The base flange of the mounting ring 386 carries a pair of rivet nuts 390 to receive the bolts 391 by which the blade 315 is secured to the driven rotor.

Figure 10:
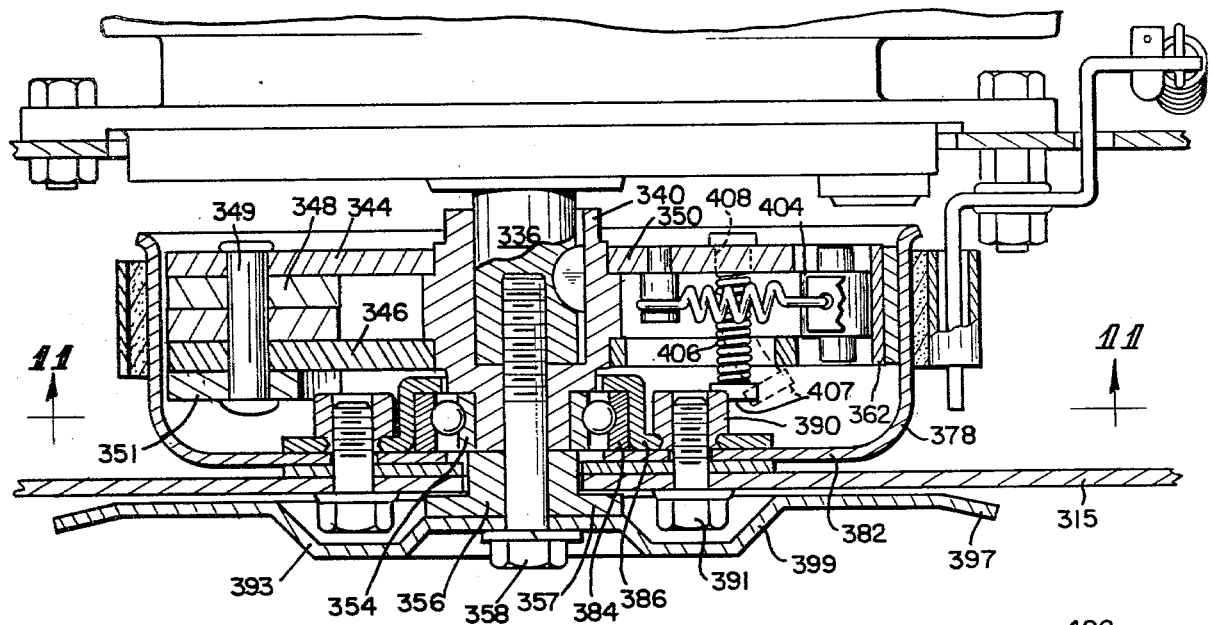
FIG. 10 is a section showing a modified clutch rotor having self-energizing clutch shoes, added mass segments on the bottom of the rotor, an auxiliary flywheel disk below the blade, and a different audible signal device.
Figure 13:
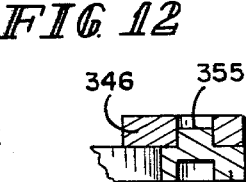
FIG. 13 is a fragmental section on the line 13—13 of FIG. 11.

Additional mass and inertia are added to the rotor 350 by mounting against the bottom plate 346 of the rotor three arcuate segments 351. These are stamped from a continuous strip of heavy metal, like the quarter-inch plate from which the rotor plates are stamped, and have similar arcs at their inner and outer peripheries so that they can be cut from such strip without waste. At one end, each segment is formed with a hole 353 to receive the shoe-mounting rivet 368 by which the clutch shoes are mounted to the rotor as described below. At the opposite end, each segment is half-perforated to form an upstanding boss 355 which takes into a punched hole in the bottom rotor plate 346, as shown in FIG. 13. Each segment is thus stabilized at each end by the elements 368 and 355, and it is firmly secured in place by the rivet 368 and by a rivet 349 which extends through it at the center and is used to secure the spacer slugs 348 in the rotor assembly, as shown in FIG. 10. The three segments 351 lie in and above an annular clearance space defined at the outside by the outer cylindrical wall of the driven drum 378 and at the inside by the path of relative movement of the rivet nuts 390 on the driven drum, and are thus nested within that drum in axially overlapping relation with the central mounting structure of the drum on the ball bearing set 354, 384. In a prototype embodiment of the present invention, the basic flywheel-clutch rotor 350 had a polar moment of inertia of 22.7 lb. in.$^2$, and the three segments 351 added an additional 3.7 lb. in.$^2$ to give the rotor 350 a total polar moment of 26.4 lb. in.$^2$.

Still further polar moment of inertia for the rotating parts attached to the engine shaft 336 was provided by adding a supplemental flywheel plate 393 below the blade 315. As shown in FIG. 10, the spacer 356 at the bottom of the hub 340 has an upper portion of a size sufficient to overlap the inner bearing race and to extend through a central opening in the blade 315. Below the blade, such spacer has a wide flange 357, against which the auxiliary flywheel plate 393 is mounted. Such plate is a circular disk of heavy sheet metal which is desirably stiffened by forming it with a down-turned rim 397 at its outer periphery and with an annular depression 393 which defines a clearance path for the heads of the blade bolts 391. Such auxiliary flywheel plate lies below the blade 315 and must necessarily be attached to the engine shaft after the engine has been mounted on the mower deck and the blade attached. Such auxiliary plate can be of larger diameter than the driven drum 378 to increase its polar moment of inertia. In a prototype embodiment of the invention, the auxiliary flywheel plate 393 had a polar moment of inertia of 7.8 lb. in.$^2$, which when added to the moment of the rotor 350, gave a total moment of 34.2 lb. in.$^2$.

The modification of FIGS. 10-13 includes self-energizing clutch shoes and provides a more aggressive centrifugal clutching action. It also provides for modifying the clutching action by the addition of selected amounts of added mass for varying the centrifugal response of the shoes. In the modification of FIGS. 2-5, the shoes 62 were connected at their leading ends to anchor pins 68, so that they trailed such pins in the direction of rotation and acted as flails and were not self-energizing. In the modification of FIGS. 10-13, the shoes 362 are drivingly connected at their trailing ends to the anchor pins or rivets 368 and extend forward in the direction of rotation therefrom, so that the shoes are positively self-energizing. As shown, the shoes 362 are mounted in circumferentially spaced shallow recesses 360 in the two plates of the rotor 350, and the rivet 368 which provides the shoe drive pin is mounted in holes in the plates at the trailing ends of the recesses 360. Each shoe 362 is formed with a wide clutch face, equal to the width of the rotor 350, and with narrower tangs at its opposite ends which enter between the two plates of the rotor. The tang 366 at the trailing end of the shoe extends inward from the arcuate clutch-free portion at an angle to the radial plane through the center of the pin 368, and such angle may be selected to produce a camming action which tends to cam the trailing end of the shoe inward toward a rectracted position with a camming force which is readily overcome by the centrifugal force on the shoe during clutching engagement. As shown, such angle is about 35°. At the end of the inward bent portion of the tang 366, such tang is bent at an arc about the periphery of the supporting pin 368 and thence through an outward extending hook portion long enough to retain the tang and shoe in place. At the leading end of the shoe 362, the tang 370 is bent inward and connected to a retracting spring 372 having a spring force selected to give the desired clutching action.

Figure 12:
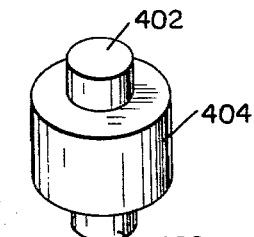
FIG. 12 is a perspective view of a roller weight which is added behind the shoes of FIG. 11 to vary the shoe response to centrifugal force.
Figure 11:
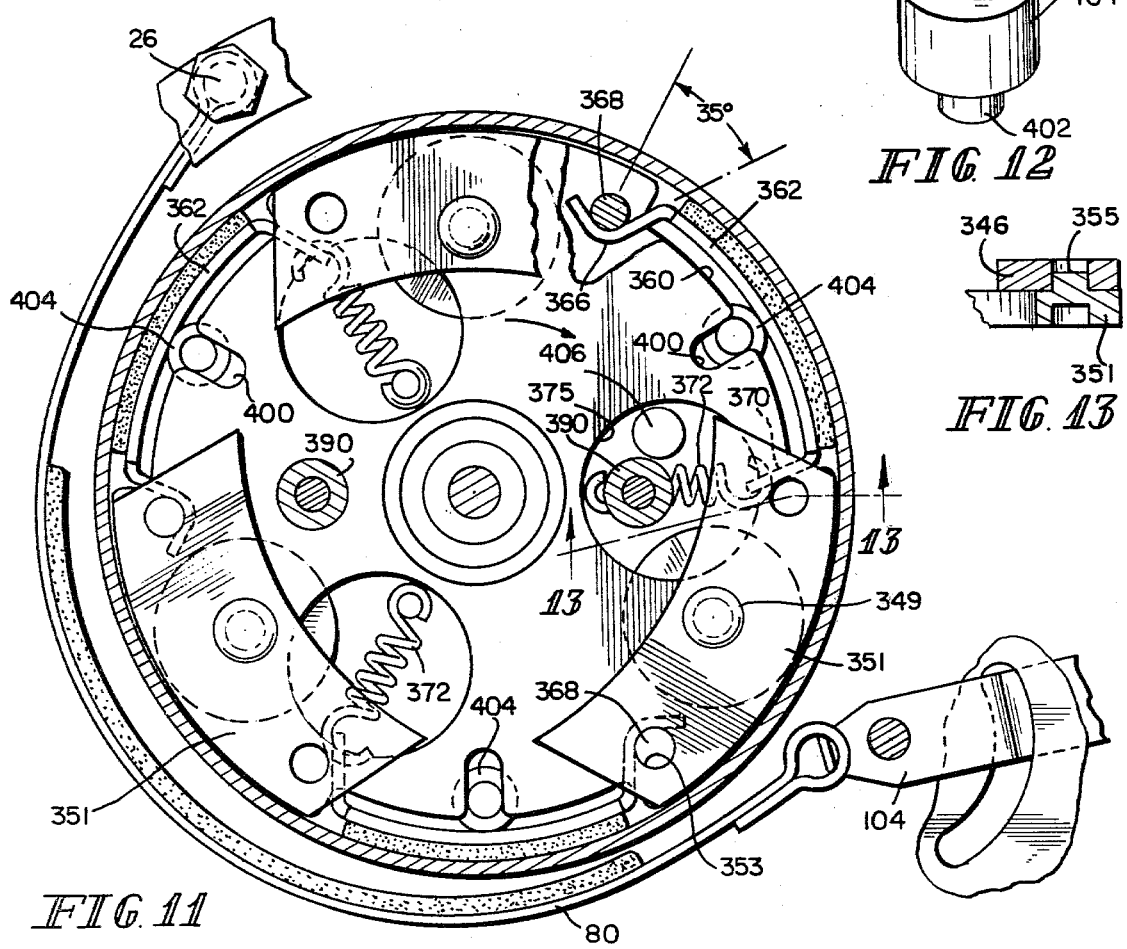
FIG. 11 is a section taken on the line 11—11 of FIG. 10 showing the flywheel-clutch rotor in bottom elevation.

The clutching action of the shoes 362 may be varied by mounting additional weights behind them. For this purpose, the two side plates of the rotor 350 are formed with radial notches 400 at the centers of the recesses 360. These are adapted to receive the end pintles 402 of cylindrical weights 404, as shown in FIGS. 11 and 12. Such rotor weights may be made in various sizes so as to add selected amounts of mass behind the clutch shoes.

The assembly of the shoes 362 to the rotor 350 is simplified by the use of the hook-like tangs 366 at the ends of the shoes 362, in that the shoes may be added after the rivets 368 have been mounted in the rotor. Accordingly, it is permissible and desirable to permanently fix the rivets 368 in the rotor so that they positively secure the segments 351 to the rotor, during the manufacture of the rotor and before its assembly with the shoes 362. Thereafter, the shoes may be added by hooking the tangs 366 under such permanently fixed rivets 368 and attaching the retraction springs 372 to the leading ends of the shoes. As before, the bottom plate 346 of the rotor 350 is provided with circular openings 375 to provide access to the location of the springs 372.

Instead of the clicker lever 110 shown in FIGS. 2 and 4, the modification of FIGS. 10-13 has a simplified audible signal-making device. This is more fully disclosed and claimed in co-pending application Ser. No. 195,745, filed Oct. 10, 1980. The clicker consists of a tight wound coil spring 406, which is mounted at its upper end in a hole 408 in the top plate 344 of the rotor 350 and extends downward through one of the openings 375 in the bottom plate, into the path of the rivet nuts 390 for the bolts 391 which fasten the blade 315 to the driven rotor drum 378. The bottom end of the spring post 406 carries a striker head 407, which normally lies in the path of the nuts 390 so as to be struck thereby if the driven rotor is rotating while the driving rotor 350 is stopped. The spring post 406 is flexible over its length, so that when the rotor 350 is rotating at some predetermined speed, the flexible spring post 406 will flex outward to the dotted line position shown in FIG. 10 where it will clear the path of the nuts 390 and produce no signal. The upper end of the spring post 406 may be mounted in the hole 408 in the top plate 344 of the rotor 350 by inserting a threaded screw-like element in the upper end of the spring and then driving the assembly downward into the hole with a tight press-fit.

The assembly and operation of the modification of FIGS. 10-13 is similar to that of the earlier modification. One primary difference is that the shoes 362 are drivingly connected to the rotor 350 at their trailing ends rather than their leading ends, so that they are self-energizing and have an aggressive clutching action, and that such action may be varied by adding rollers 404 of selected weight and mass behind the shoes 362.

A second primary difference of the modification of FIGS. 10-13 is that it provides greater flywheel effect for the engine. Either the added segments 352 or the added auxiliary flywheel plate 393 may be used separately or both may be used together. The effects of doing so is shown in the bar graph of FIG. 14. As there shown, a typical cast-iron flywheel of a rotary lawn mower engine had a polar moment of inertia of 27.7 lb. in.$^2$. But a typical twenty-inch mower blade has a much higher polar moment of 57.2 lb. in.$^2$ The cast-iron flywheel was relatively expensive in that it required a sand-casting operation, machining operations as to insert in it the necessary magneto magnet and a surrounding magnetically insulating material such as aluminum which would insulate the magnet from the cast iron. Accordingly, the cast-iron flywheel on rotary lawn mower engines was replaced by a lightweight aluminum flywheel which could be made much less expensively by directly die casting the aluminum about the magneto magnet to produce a rotor which would serve as the magneto rotor and as the blower required at the top of the engine. The polar moment of inertia of this top rotor was not significant because the engine could rely on the high polar moment of the fixed mower blade for its necessary flywheel effect. In FIG. 14, the vertical line at 27 on the horizontal scale represents the minimum moment of inertia required for satisfactory starting of a first representative rotary lawn mower engine of three to three and one-half horsepower. The line at 35 represents the minimum moment of inertia required for satisfactory starting of a second engine, while the line at 43 represents the minimum moment of inertia required for satisfactory starting of a higher horsepower third engine. The graph shows that a representative aluminum top flywheel has a polar moment of 10.3 lb. in.$^2$, that a representative rotor 50 as shown in FIGS. 1-5 has a polar moment of 22.7, and that these together provide a rotary moment of 33.0 lb. in.$^2$ which is more than sufficient to meet the 27 lb. in.$^2$ requirement of the first engine.

The graph also shows that a rotor 350 with the added segments 351 has a moment of inertia of 26.4 lb. in.$^2$ and, when combined with the aluminum top rotor, provides a polar moment of 36.7 lb. in.$^2$ which is amply sufficient to meet the 35 lb. in.$^2$ requirement of the second engine. It also shows that a rotor 50, without the segments 351, when combined with the aluminum top rotor and with an auxiliary flywheel disk 393, gave a total polar moment of 44.2 lb. in.$^2$ which was amply sufficient to meet the 43 lb. in.$^2$ requirement of the third engine. Still more polar moment is provided by combining the aluminum top rotor with a rotor 350 which includes the added segments 351, and also includes the auxiliary flywheel disk 393, and that this provides a total polar moment of 47.8 lb. in.$^2$. Still higher polar moments can be obtained by employing a cast-iron top flywheel in combination with the elements of the present invention.

The invention is thus highly effective in accomplishing its purpose of providing adequate flywheel mass at the bottom of the engine and as part of the clutch-brake mechanism through which the blade is driven and controlled. As previously noted, the provision of that mass closely adjacent the blade has further advantages in the practical operation of a rotary lawn mower.

I claim:

1. A lawn mower, comprising an engine including a vertical power shaft with a top rotor thereon having a limited polar moment of inertia and having a depending output end for the reception of a rotary blade having a relatively large polar moment of inertia, wherein the improvement comprises a combined flywheel and clutch driver rotor fixedly mounted on said shaft end, said rotor being of large mass and diameter so as to have a large polar moment of inertia, and clutch shoes mounted thereon having clutch face means substantially at the outer periphery of said rotor for engagement with a long torque arm against a surrounding driven clutch element, a blade carrier rotatable on the axis of the shaft output end and including a clutch-driven element having a drum portion surrounding the flywheel-clutch rotor and having clutch face means for engagement by the clutch face means of said clutch shoes mounted on said rotor for driving a blade on the carrier, and means for retracting said clutch shoes from said driven element so as to declutch the shaft from the blade carrier.

2. A lawn mower as in claim 1 in which the clutch shoes mounted on the flywheel rotor are centrifugal shoes, and the disengaging means comprising springs normally retracting the shoes to a disengaged position.

3. A lawn mower as in claim 2 in which the flywheel rotor has a moment of inertia sufficient to provide the major portion of the flywheel effect of the engine.

4. A lawn mower as in claim 3 in which the flywheel rotor and top rotor have a combined moment of inertia exceeding one-half the moment of inertia of the blade.

5. A lawn mower comprising an engine having a vertical power shaft with a top rotor thereon with a limited polar moment of inertia and having a depending output end for the reception of a rotary blade carrier, wherein the improvement comprises a generally circular combined flywheel and clutch-driving rotor fixedly mounted on said shaft end, a plurality of centrifugal clutch shoes mounted on said rotor at spaced points about the periphery of such rotor, said shoes occupying not substantially more than one-half the periphery of said rotor and said rotor including inertia mass portions between such shoes at the periphery of the rotor, a blade carrier rotatably mounted on the axis of the shaft output end and including a clutch drum surrounding said rotor and positioned for engagement by said shoes, said rotor including said inertia mass portions and shoes having a greater moment of inertia than said top rotor and sufficient to provide the major portion of the flywheel effect of the engine.

6. A lawn mower as in claim 5 wherein said rotor comprises at least one circular plate portion which has circumferentially spaced shallow recesses in its periphery and the shoes lie partially in such recesses and partially out of the plane of such plate portion.

7. A lawn mower as in claim 5 wherein said inertia mass portions are substantially in the same plane with the shoes and circumferentially between the shoes.

8. A lawn mower as in claim 7 and further comprising an auxiliary flywheel disk fixedly mounted on said shaft output end outside said drum.

9. A lawn mower as in claim 8 in which said blade carrier is rotatably mounted on the shaft end below the flywheel rotor and said auxiliary flywheel disk is mounted on the shaft below the blade carrier.

10. A lawn mower as in claim 5 with the addition of an auxiliary flywheel disk mounted on the shaft end below the blade carrier.

11. A lawn mower as in claim 5 with the addition of brake means for engaging a surface of the clutch drum to stop rotation of the blade carrier.

12. A lawn mower as in claim 5 in which said clutch drum has a substantially imperforate bottom wall and cylindrical side wall and within which said rotor is nested, and said flywheel rotor has a substantially imperforate circular top surface extending into running clearance relation with the clutch drum so as to form a substantially closed assembly adapted to operate in exposed condition in the same chamber with the blade of the mower.

13. A lawn mower as in claim 5 in which the combined flywheel rotor has a polar moment of inertia at least twice that of the engine top rotor.

14. Combined flywheel and clutch mechanism for a lawn mower engine or the like having a crank shaft and rotor means thereon providing not more than a minor portion of the flywheel effect required by the engine, comprising a heavy, generally circular metal rotor structure and means for mounting the same on the shaft for rotation on the axis thereof as a flywheel, centrifugal clutch shoes mounted at circumferentially spaced points about said rotor structure and having clutch faces at the outer periphery thereof, said rotor including inertia mass portions circumferentially between the spaced shoes and extending substantially to the periphery of the rotor, a clutch drum and means for mounting the same for rotation on said axis, said drum having an outer wall and the rotor structure being nested substantially within the drum with its clutch shoes presented for centrifugal engagement with the inner surface of such outer wall, and means for mounting a mower blade or other driven element for operation with the clutch drum, said metal rotor structure and shoes being adapted to provide the major portion of the flywheel effect required by the engine.

15. Mechanism as in claim 14 with the addition of a brake for engaging the outside surface of the clutch drum to arrest rotation thereof and the driven element.

16. Mechanism as in claim 14 in which said metal rotor is formed at its periphery with circumferentially spaced shallow recesses separated by full-radius segments of a length at least substantially equal to the circumferential length of the recesses, so as to locate both the mass of such segments and the shoe faces at the periphery of the rotor.

17. Lawn mower mechanism comprising an engine having a vertical power shaft with a depending end, a combined clutch and flywheel rotor mounted on the depending end of said shaft, and including a pair of generally circular metal plates mounted in spaced parallel relation in planes normal to the axis of the shaft, a plurality of spacer weights mounted between said plates at angularly spaced points about and adjacent the periphery thereof to add mass at the periphery of the rotor, the plates being secured together and to said weights so as to fix the weights in place and to secure the plates against the weights as spacers, a plurality of centrifugal clutch shoes mounted at angularly spaced positions about the periphery of said rotor, between said spacer weights, and means disposed axially between the plates for connecting the shoes in operative relation with the rotor, and additional inertia mass attached against an outer face of one of said metal plates adjacent the periphery thereof to increase the polar moment of inertia of the rotor.

18. Lawn mower mechanism as in claim 17 in which such additional inertia mass is in the form of arcuate segments attached against the bottom face of the rotor.

19. Lawn mower mechanism as in claim 17 in which the additional inertia mass and the spacer weights are attached at least in part by common rivets or the like.

20. Lawn mower mechanism comprising an engine having a vertical power shaft with a depending end, a combined clutch and flywheel rotor mounted on the depending end of said shaft, and including a plurality of centrifugal clutch shoes mounted at angularly spaced positions on said rotor and having clutch faces substantially at the periphery of said rotor, a clutch-driven element mounted for rotation on said depending end of the shaft, said driven element having an outer cylindrical wall surrounding the periphery of said rotor for engagement by the shoes thereof, having an end web supporting such wall, and having mounting means extending axially inward of and spaced inward from said such wall so as to define an annular pocket between such means and the outer wall, and inertia mass material attached to the rotor so as to lie in such pocket.

21. Drive mechanism for driving a rotary lawn mower blade from a vertical axis engine having a depending output shaft, comprising a combined flywheel and centrifugal clutch drive rotor, said rotor including one or more generally circular plates of a material having large mass, a plurality of centrifugal clutch shoes carried by said plates at angularly spaced points about the periphery of said rotor and having outwardly presented clutch faces at the periphery of the rotor, such shoes being mounted thereto for centrifugally responsive engagement with a driven drum thereabout, said shoes extending over not substantially more than half the circumference of the rotor, and inertia mass material on said rotor positioned in substantially the same plane with and angularly between said shoes at the periphery of the rotor, a driven drum mounted for rotation coaxially with said rotor and having a shoe-engaging surface positioned for engagement by said shoes, and means for mounting a mower blade or the like to said driven drum, said rotor and inertia mass material and clutch shoes having a large polar moment of inertia so as to provide a flywheel effect at the point of attachment of the rotor to the engine shaft.

22. Drive mechanism as in claim 21 in which said drum includes bottom mounting means and has a cylindrical drum portion which extends upward therefrom, said rotor being positioned within the open upper end of such drum portion and having a top surface which substantially closes such upper end, whereby the assembly of rotor and drum is adapted to be operated in exposed position within a housing that contains the operating mower blade.

23. Drive mechanism as in claim 21 with the addition of a band brake mounted for external engagement with said driven drum.

24. A lawn motor, comprising an engine having a vertical power shaft with a top rotor thereon with a limited polar moment of inertia and having a depending output end for the reception of a rotary blade carrier, wherein the improvement comprises a clutch-driving element fixedly mounted on said shaft end, a blade carrier rotatably mounted on the shaft output end and including means for mounting a rotary mower blade thereon and a clutch-driven element for engagement by said driving element, brake means for stopping rotation of the blade carrier and blade and means for applying such brake means and causing disengagement of said clutch elements so as to disconnect the engine from driving relation with the blade and stop the blade without stopping the engine, and an auxiliary flywheel disk fixedly mounted on said shaft output end and disposed closely below said blade carrier for providing supplemental inertia mass adjacent the blade and rotatable with the engine when the blade drive is disconnected.

* * * * *